United States Patent
Katou

(10) Patent No.: US 8,700,941 B2
(45) Date of Patent: Apr. 15, 2014

(54) SELECTING A MODULATION TECHNIQUE TO CONSERVE POWER WHEN POWER SUPPLIED TO AN ENTIRE POWER LINE COMMUNICATION SYSTEM FALLS BELOW A THRESHOLD POWER

(75) Inventor: Osamu Katou, Osaka (JP)

(73) Assignee: Panasonic Corporation, Osaka (JP)

( * ) Notice: Subject to any disclaimer, the term of this patent is extended or adjusted under 35 U.S.C. 154(b) by 167 days.

(21) Appl. No.: 13/242,572

(22) Filed: Sep. 23, 2011

(65) Prior Publication Data

US 2012/0011388 A1 Jan. 12, 2012

Related U.S. Application Data

(63) Continuation of application No. PCT/JP2009/005189, filed on Oct. 6, 2009.

(30) Foreign Application Priority Data

May 15, 2009 (JP) .................................. 2009-118374

(51) Int. Cl.
*G06F 1/00* (2006.01)
*G06F 1/26* (2006.01)
*G06F 1/32* (2006.01)
*G06F 11/30* (2006.01)

(52) U.S. Cl.
USPC ............................ 713/340; 713/300; 713/320

(58) Field of Classification Search
None
See application file for complete search history.

(56) References Cited

U.S. PATENT DOCUMENTS

| | | | | |
|---|---|---|---|---|
| 2004/0122531 A1* | 6/2004 | Atsuta et al. ....................... | 700/1 |
| 2005/0247775 A1* | 11/2005 | Gloekler et al. .............. | 235/375 |
| 2007/0035135 A1* | 2/2007 | Yoshida .......................... | 290/44 |
| 2008/0039129 A1* | 2/2008 | Li et al. .......................... | 455/522 |
| 2008/0144582 A1* | 6/2008 | Das et al. ....................... | 370/335 |
| 2008/0153532 A1* | 6/2008 | Camp ............................. | 455/522 |
| 2008/0258902 A1* | 10/2008 | Engellenner .................. | 340/505 |
| 2008/0292007 A1* | 11/2008 | Lida et al. ...................... | 375/257 |
| 2009/0069057 A1* | 3/2009 | Haartsen et al. .............. | 455/574 |
| 2010/0086081 A1* | 4/2010 | Fujita et al. ................... | 375/300 |
| 2011/0204726 A1* | 8/2011 | Ito ................................. | 307/117 |

FOREIGN PATENT DOCUMENTS

| | | |
|---|---|---|
| JP | 2001-237904 | 8/2001 |
| JP | 2004-185244 | 7/2004 |
| JP | 2004-201065 | 7/2004 |

(Continued)

OTHER PUBLICATIONS

Vankka, et al. "A Multicarrier GMSK Modulator", IEEE Journal on Selected Areas in Communications, vol. 19, No. 6, Jun. 2001.*

*Primary Examiner* — Thomas Lee
*Assistant Examiner* — Robert Cassity
(74) *Attorney, Agent, or Firm* — McDermott Will & Emery LLP

(57) ABSTRACT

A comparison section determines whether the amount of electric power acquired by a power management section is less than a predetermined threshold. A selection section selects, based on the determination result from the comparison section, at least one modulation/demodulation scheme among a plurality of kinds of modulation/demodulation schemes so that power consumption of modulation/demodulation operation is smaller when the amount of electric power is less than the predetermined threshold than when it is not less than the predetermined threshold. A power line communication function section transmits a control signal indicating the modulation/demodulation scheme selected by the selection section to the power line and performs modulation/demodulation operation under the selected modulation/demodulation scheme.

13 Claims, 4 Drawing Sheets

(56) References Cited

FOREIGN PATENT DOCUMENTS

| JP | 2004-266217 | 9/2004 |
| JP | 2007-306738 | 11/2007 |
| JP | 2008-205678 | 9/2008 |
| JP | 2009-088620 | 4/2009 |

* cited by examiner

SELECTING A MODULATION TECHNIQUE TO CONSERVE POWER WHEN POWER SUPPLIED TO AN ENTIRE POWER LINE COMMUNICATION SYSTEM FALLS BELOW A THRESHOLD POWER

CROSS-REFERENCE TO RELATED APPLICATION

This is a continuation of PCT International Application PCT/JP2009/005189 filed on Oct. 6, 2009, which claims priority to Japanese Patent Application No. 2009-118374 filed on May 15, 2009. The disclosures of these applications including the specifications, the drawings, and the claims are hereby incorporated by reference in their entirety.

BACKGROUND

The present disclosure relates to a power line communication system where a plurality of power line communication devices are connected to each other via a power line and can perform signal modulation/demodulation operation under a plurality of modulation/demodulation schemes, and a power line communication device constituting such a power line communication system.

In recent years, with the evolution and proliferation of networks, interest has been growing in power line communication (PLC) that is a communication technology using power lines. The range of application of this technology has spread, not only to networks in ordinary homes and ships, but also to fields such as automobiles.

In a power line communication system disclosed in Japanese Patent Publication No. 2004-201065 (Patent Document 1), a plurality of power line communication devices (electric appliances) are connected via a power line. In this power line communication system, when communication is performed between power line communication devices different in modulation/demodulation scheme, a management device converts a signal transmitted from one power line communication device to the other to a signal of a modulation/demodulation scheme adopted by the other power line communication device (receiver). The power line also supplies electric power received from a power company to the power line communication devices.

Japanese Patent Publication No. 2008-205678 (Patent Document 2) discloses a power line communication device that performs modulation operation of modulating an internal signal to be transmitted to a power line and demodulation operation of demodulating an external signal received from the power line. This power line communication device, which receives electric power via the power line, switches the mode of the modulation/demodulation operation to a power saving mode according to environmental temperature changes, etc.

SUMMARY

In Patent Document 1 described above, the amount of electric power supplied to the power line is not reflected in the modulation/demodulation scheme. Therefore, if the electric power supplied to the power line decreases, the power line communication devices might fail to perform the modulation/demodulation operation on transmitted/received signals due to power shortage, and as a result, the communication network might fail to be maintained.

In Patent Document 2, also, the amount of electric power supplied to the power line is not reflected in the operation mode. Therefore, if the electric power supplied to the power line decreases, the power line communication device might fail to perform the modulation/demodulation operation due to power shortage, and as a result, the communication network might fail to be maintained.

In view of the above, it is an objective of the present disclosure to provide a power line communication system having a plurality of power line communication devices connected to each other via a power line, where failure in maintaining a communication network due to shortage of supply power is prevented.

To attain the above objective, an embodiment of the present disclosure is a power line communication system having a plurality of power line communication devices connected to each other via a power line, each of the power line communication devices being capable of performing modulation operation for an internal signal to be transmitted to the power line and demodulation operation for an external signal received from the power line under a plurality of kinds of modulation/demodulation schemes, wherein one of the plurality of power line communication devices includes a power management section configured to acquire the amount of electric power supplied to the entire power line communication system, a comparison section configured to determine whether the amount of electric power acquired by the power management section is less than a predetermined threshold, a selection section configured to select, based on the determination result from the comparison section, at least one modulation/demodulation scheme among the plurality of kinds of modulation/demodulation schemes so that power consumption of modulation/demodulation operation is smaller when the amount of electric power is less than the predetermined threshold than when it is not less than the predetermined threshold, and a power line communication function section configured to transmit a control signal indicating the modulation/demodulation scheme selected by the selection section to the power line and perform modulation/demodulation operation under the selected modulation/demodulation scheme.

In the embodiment of the present disclosure described above, the modulation/demodulation scheme is selected so that the power consumption of modulation/demodulation operation is smaller when the amount of electric power is less than the predetermined threshold than when it is not less than the predetermined threshold. Therefore, since the power consumption decreases with decrease in the amount of electric power supplied to the entire power line communication system, failure in maintaining the communication network due to shortage of supply power is prevented.

According to the present disclosure, the power consumption decreases with decrease in the amount of electric power supplied to the entire power line communication system. This makes it possible to prevent failure in maintaining the communication network due to shortage of supply power.

DETAILED DESCRIPTION

Embodiments of the present disclosure will be described hereinafter with reference to the accompanying drawings.

(First Embodiment)

Figure 1:
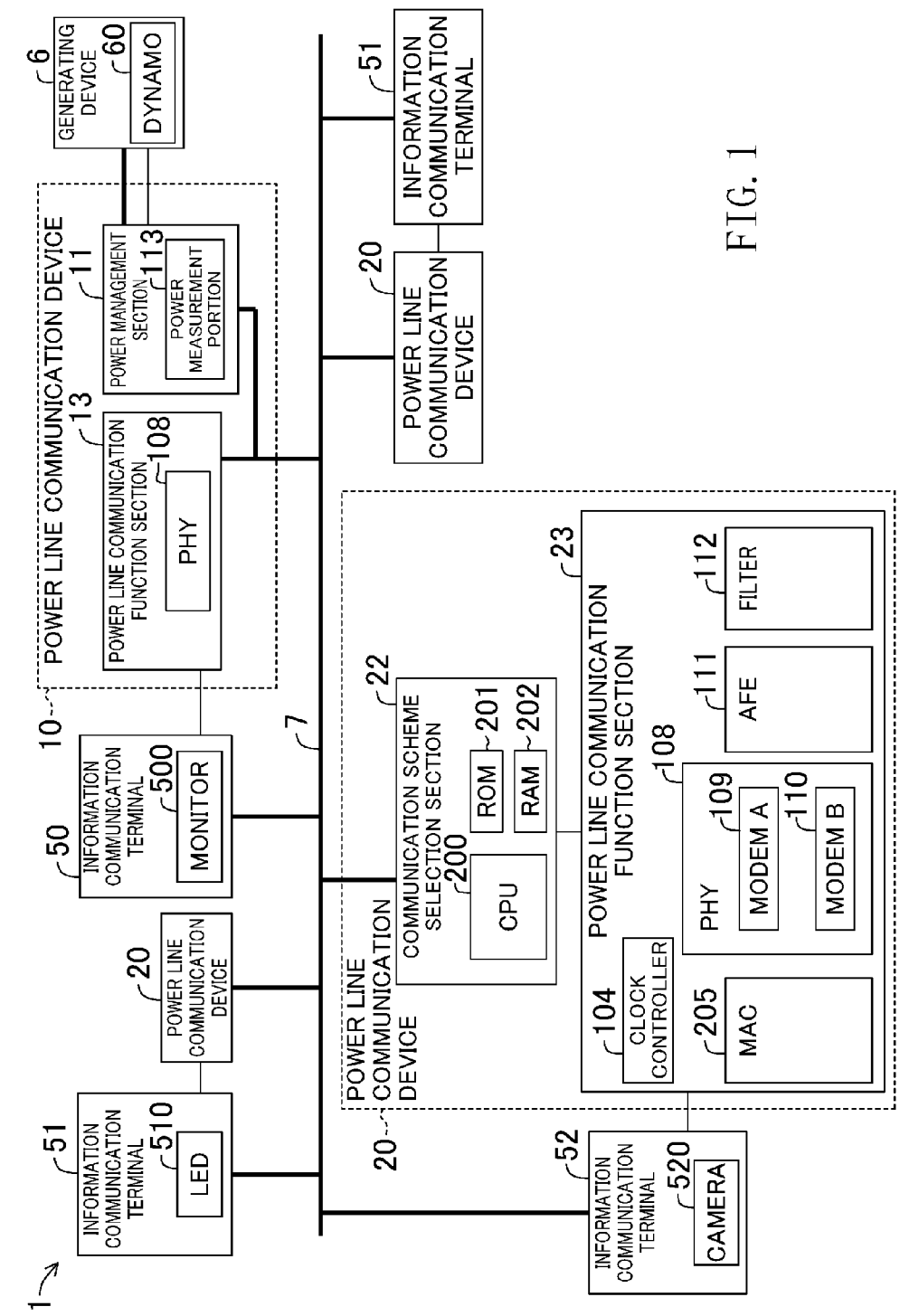
FIG. 1 is a block diagram of a power line communication system of the first embodiment.

As shown in FIG. 1, a power line communication system 1 of the first embodiment includes one power line communication device 10, a plurality of power line communication devices 20, and a generating device 6 for supplying electric power to a power line 7. The power line communication devices 10 and 20 are connected to one another via the power line 7. The generating device 6 supplies electric power to the power line communication device 10, and also to the power line communication devices 20 via the power line 7.

The power line communication devices 10 and 20 perform modulation operation for an internal signal to be transmitted to the power line 7 and demodulation operation for an external signal received from the power line 7. The power line communication devices 10 and 20 can perform such modulation/demodulation operation under a multi-carrier scheme (hereinafter referred to as communication scheme A) such as orthogonal frequency division multiplexing (OFDM) modulation and under a single-carrier scheme (hereinafter referred to as communication scheme B) such as amplitude shift keying (ASK) modulation.

The generating device 6 uses a dynamo 60 of the type used in bicycles, etc. as a power generation source. The dynamo 60 generates a pulse-waveform current.

An information communication terminal 50 provided with a monitor 500 is connected to the power line communication device 10. An information communication terminal 51 provided with a light-emitting device (LED) 510 or an information communication terminal 52 provided with a camera 520 is connected to each of the power line communication devices 20. The information communication terminals 50 and 52 have an AV function requiring high-speed communication of images, sound, etc. The information communication terminal 51 operates with only a simple control signal.

Figure 2:
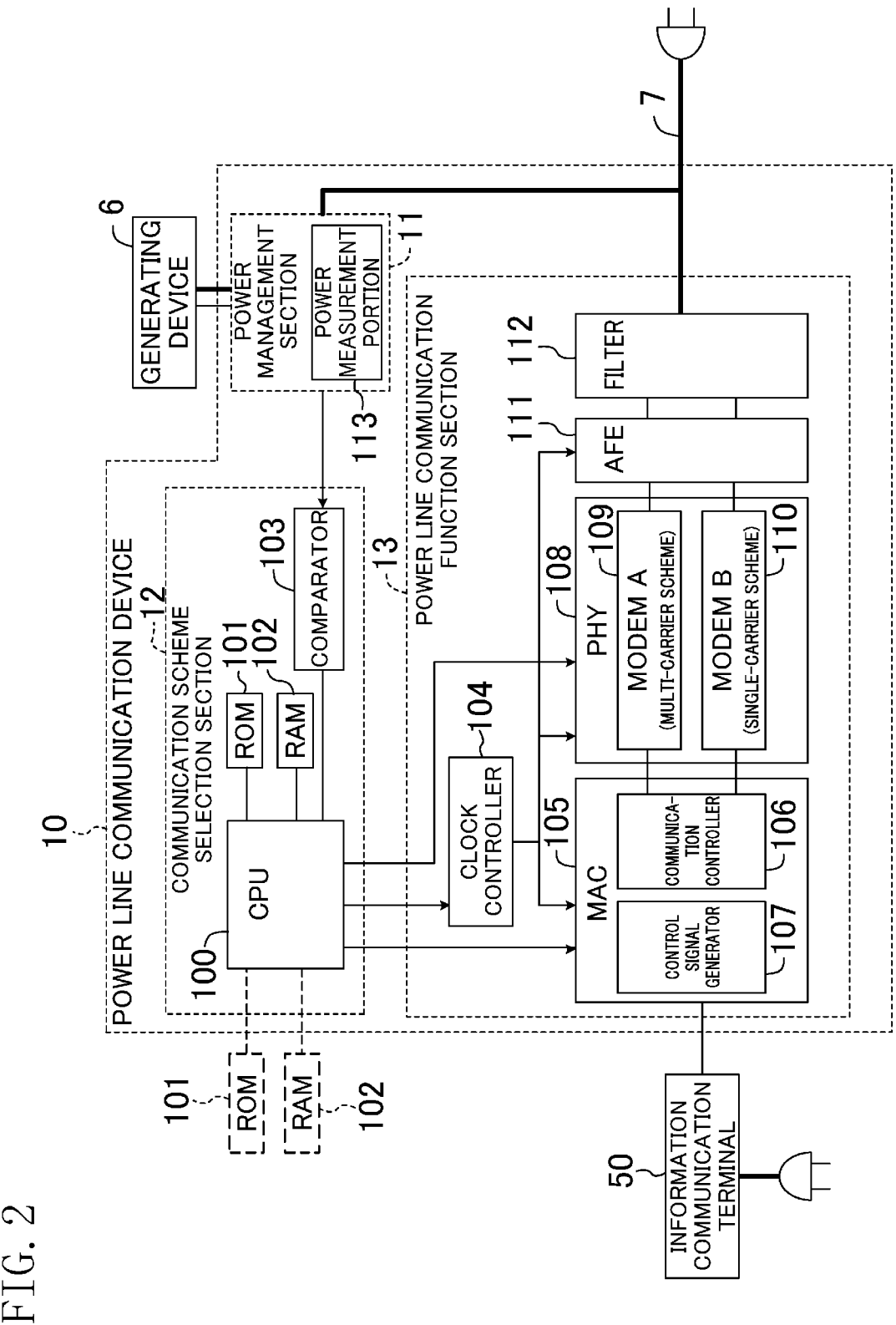
FIG. 2 is a block diagram of a power line communication device of the first embodiment.

As shown in FIG. 2, the power line communication device 10 includes a power management section 11, a communication scheme selection section 12, and a power line communication function section 13.

Figure 3:
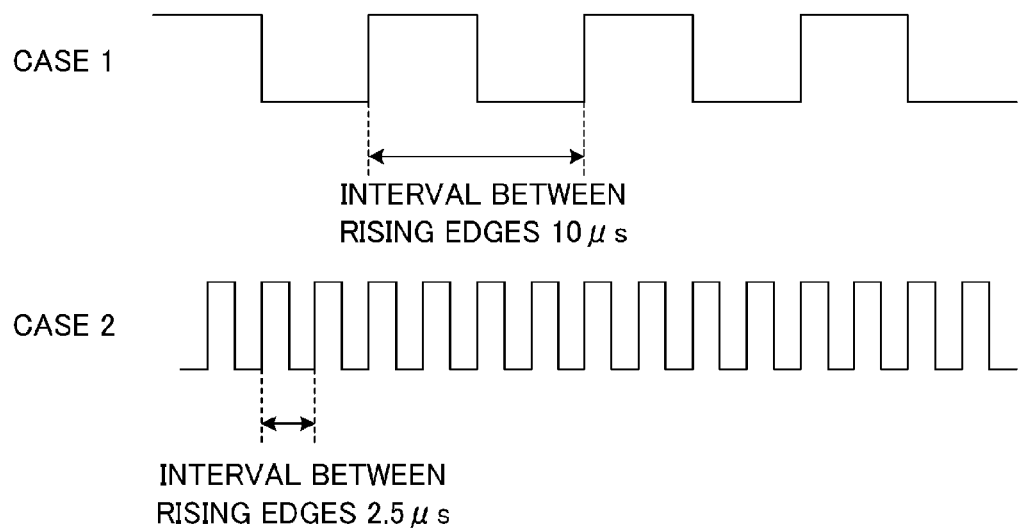
FIG. 3 is a waveform chart showing examples of a current generated by a dynamo in the first embodiment.

The power management section 11 is provided with a power measurement portion 113 that measures and acquires the amount of electric power supplied to the entire power line communication system 1 by the generating device 6. The power measurement portion 113 measures the interval between rising edges of continuous pulses of a current generated by the dynamo 60, and acquires the amount of electric power supplied to the entire power line communication system 1 based on the measured interval. Specifically, as shown in FIG. 3, when the supply power is 0.5 W in case 1 where the interval between rising edges is 10 µs, it is assumed to be four times as large as that in the case 1, i.e., 2 W in case 2 where the interval between rising edges is 2.5 µs.

The communication scheme selection section 12 includes a central processing unit (CPU) 100, a read only memory (ROM) 101, a random access memory (RAM) 102, and a comparator 103. Although the ROM 101 and the RAM 102 are placed inside the power line communication device 10, they may be placed externally as shown by the broken lines in FIG. 2.

The maximum power consumption of each of the power line communication devices 10 and 20 and the maximum power consumption of each of the information communication terminals 50, 51, and 52 connected to the power line communication devices 10 and 20 are stored in advance in the ROM 101 or the RAM 102 (inner memory) at the time of initial setting (startup), write of programs, etc. The number of power line communication devices 10 and 20 connected to the power line 7 is kept track of through operations such as authentication processing and address allocation (address exchange processing) executed at the time of initial startup, device addition/departure, etc., and written in the RAM 102.

The comparator 103 compares the amount of electric power acquired by the power measurement portion 113 of the power management section 11 with a predetermined threshold, to determine whether the amount of electric power is less than the predetermined threshold, and notifies the CPU 100 of the determination result. The comparator 103 determines in advance the predetermined threshold based on the total number of power line communication devices 10 and 20 connected to the power line 7, the maximum power consumption of each of the power line communication devices 10 and 20, and the maximum power consumption of each of the information communication terminals 50, 51, and 52. For this determination, the comparator 103 reads the maximum power consumption of each of the power line communication devices 10 and 20 and the information communication terminals 50, 51, and 52 from the ROM 101 or the RAM 102. The predetermined threshold can be determined by the following expression: (predetermined threshold)=(maximum power consumption of each of the power line communication devices 10 and 20+maximum power consumption of each of the information communication terminals 50, 51, and 52)× (total number of power line communication devices 10 and 20 connected to the power line 7).

The CPU (selection section) 100 selects the communication scheme B if it is determined by the comparator 103 that the amount of electric power acquired by the power management section 11 is less than the predetermined threshold, or selects the communication schemes A and B if it is determined that the amount of electric power is not less than the predetermined threshold. According to the selection result, the CPU 100 controls the power line communication function section 13.

The power line communication function section 13 transmits a control signal indicating the modulation/demodulation scheme selected by the CPU 100 to the power line 7, so that the other power line communication devices 20 perform modulation/demodulation operation under the modulation/demodulation scheme indicated by the control signal. Also, the power line communication function section 13 performs modulation/demodulation operation under the modulation/demodulation scheme selected by the CPU 100. The power line communication function section 13 includes a clock controller 104, a media access control (MAC) 105, a physical layer (PHY) 108, an analog front end (AFE) 111, and a filter 112. The filter 112 is comprised of a band-pass filter (BPF).

The clock controller 104 changes the frequency of a clock supplied to the MAC 105 and the PHY 109, and controls ON/OFF of clock supply, under the control by the CPU 100.

The MAC 105 includes a communication controller 106 and a control signal generator 107.

The communication controller 106 receives a signal from the information communication terminal 50 and transfers the received signal to either a modem A 109 or a modem B 110 of the PHY 108. If the communication scheme B is selected by the CPU 100 of the communication scheme selection section 12, the signal received from the information communication terminal 50 is transferred to the modem B 110. If any communication schemes installed can be used, i.e., if both the communication scheme A and the communication scheme B are selected by the CPU 100, the communication scheme to be used is selected according to the kind of the received signal, whether the communication network is busy or not, etc., and the signal received from the information communication terminal 50 is transferred to the modem A 109 or the modem B 110 whichever corresponds to the selected communication scheme.

The communication controller 106 also transfers a signal received from the PHY 108 to the information communication terminal 50 or the CPU 100 according to the kind of the received signal.

The control signal generator 107 generates a signal for authenticating the other power line communication devices 20, a signal for requesting switching of the communication scheme, a signal for notifying the information communication terminal 50 of switching of the communication scheme, etc., and transfers such signals to the PHY 108, under the control by the CPU 100. If it is determined by the comparator 103 that the amount of electric power acquired by the power management section 11 is less than the predetermined threshold, the control signal generator 107 generates a control signal requesting the other power line communication devices 20 to disable the communication scheme A, and transfers the control signal to the PHY 108, under the control by the CPU 100. The control signal generator 107 also generates a control signal requesting to disable any application requiring high-speed communication under the communication scheme A, and transfers the control signal to the information communication terminal 50. If the determination by the comparator 103 is changed from that the amount of electric power acquired by the power management section 11 is less than the predetermined threshold to that the amount of electric power is not less than the predetermined threshold, the control signal generator 107 generates a control signal requesting the other power line communication devices 20 to clear the disabled state of the communication scheme A, and transfers the control signal to the PHY 108, under the control by the CPU 100. The control signal generator 107 also generates a control signal requesting to enable the application requiring high-speed communication under the communication scheme A, and transfers the control signal to the information communication terminal 50.

The PHY 108 modulates a signal transferred from the MAC 105 and transfers the modulated signal to the AFE 111, and demodulates a signal received from the power line (communication network) 7 and transferred by the AFE 111 and transfers the demodulated signal to the MAC 105. The PHY 108, including the modem A 109 that performs modulation/demodulation under the communication scheme A and the modem B 110 that performs modulation/demodulation under the communication scheme B, can perform modulation operation and demodulation operation under two kinds of modulation/demodulation schemes, i.e., the communication scheme A and the communication scheme B. The communication scheme A permits higher-speed communication with shorter communication delays, but requires larger power consumption, than the communication scheme B. Note that the PHY 108 performs digital signal processing and thus transmits/receives digital signals to/from the AFE 111.

The AFE 111 converts a digital signal transferred from the PHY 108 to an analog signal to be output to the power line 7, and converts an analog signal received from the power line 7 to a digital signal to be transferred to the PHY 108.

The filter 112 removes a frequency component unnecessary for power line communication, such as surrounding noise, when outputting a signal to the power line 7 and receiving a signal from the power line 7.

Each of the power line communication devices 20 performs power line communication while switching the communication scheme according to the instruction of the power line communication device 10. The configuration of such a power line communication device 20 will be described hereinafter in detail.

The power line communication device 20 includes a communication scheme selection section 22 and a power line communication function section 23.

The communication scheme selection section 22 includes a CPU 200, a ROM 201, and a RAM 202. While the CPU 100 selects the communication scheme based on the determination result from the comparator 103 in the communication scheme selection section 12 of the power line communication device 10, the CPU 200 selects the communication scheme based on the instruction of the power line communication device 10, or more specifically, a control signal generated by the control signal generator 107 of the power communication device 10. The ROM 201 and the RAM 202 may be placed inside or outside the power line communication device 20.

The power line communication function section 23 includes a MAC 205 in place of the MAC 105 of the power line communication device 10. The MAC 205 is different from the MAC 105 in that no signal for requesting the other power line communication devices 20 to switch the communication scheme is generated. The other function of the MAC 205 is similar to that of the MAC 105.

Note that, when the information communication terminals 50 and 51 receive a control signal requesting to disable any application requiring high-speed communication under the communication scheme A from the corresponding power line communication devices 10 and 20, they output predetermined indications such as a warning on the monitor 500 that the amount of generated electric power has decreased and blinking of the LED 510.

Next, the operation of the power line communication system 1 configured as described above will be described.

In generation of electric power using the dynamo 60, it is assumed that the amount of generated electric power gradually increases. Therefore, the power line communication devices 10 and 20 are set to use only the modem B 110 adopting the communication scheme B in the initial state at startup. In this initial state, also, applications of the monitor 500 and the camera 520 of the information communication terminals 50 and 52 are disabled, and only applications operable with only a simple control signal (e.g., light ON/OFF control, etc.) are enabled.

The predetermined threshold calculated by the comparator 103 of the power line communication device 10 is $(X+Y) \times 4$ where X is the maximum power consumption of each of the power line communication devices 10 and 20, and Y is the maximum power consumption of each of the information communication terminals 50, 51, and 52 connected to the power line communication devices 10 and 20.

When the amount of electric power generated by the dynamo 60 becomes large enough to be determined by the comparator 103 of the power line communication device 10 to have reached the predetermined threshold, the comparator 103 notifies the CPU 100 of the determination result. In response to this notification, the CPU 100 controls the control signal generator 107 to generate a control signal requesting the other power line communication devices 20 to clear the disabled state of the communication scheme A so that the generated control signal is transmitted to the other power line communication devices 20 under the communication scheme B. The CPU 100 also controls the clock controller 104 to start supply of a clock necessary for modulation/demodulation operation under the communication scheme A, and instructs the communication controller 106 of the MAC 105 to transfer a signal to the modem A 109. In this way, the communication scheme selection section 12 of the power line communication device 10 allows the power line communication function section 13 to start modulation/demodulation operation under the communication scheme A.

In each of the power line communication devices 20, the MAC 205 receives the control signal requesting to clear the disabled state of the communication scheme A from the power line communication device 10, and notifies the CPU 200 of reception of the control signal. For start of modulation/demodulation operation under the communication scheme A, the CPU 200, like the CPU 100 of the power line communication device 10, controls the clock controller 104 to start supply of a clock necessary for the modulation/demodulation operation under the communication scheme A, and instructs the MAC 205 to transfer a signal to the modem A 109. Also, under the control by the CPU 200, the MAC 205 generates a control signal requesting to enable an application (of the camera 520) requiring high-speed communication under the communication scheme A, and transmits the control signal to the information communication terminal 52.

Thereafter, under the control by the CPU 100, the control signal generator 107 of the power line communication device 10 generates a control signal requesting to enable an application (of the monitor 500) requiring high-speed communication under the communication scheme A, and transmits the control signal to the information communication terminal 50.

When the amount of electric power generated by the dynamo 60 decreases to below the predetermined threshold, the CPU 100 of the power line communication device 10 controls the control signal generator 107 to generate a control signal requesting the other power line communication devices 20 to disable the communication scheme A. This control signal is transmitted to the power line communication devices 20 basically using the communication scheme B. In other words, the control signal is transmitted in the state modulated under the communication scheme B by the modem B 110. Using the communication scheme B for transmission of the control signal, the communication scheme A large in power consumption can be disabled soon. Thus, the power consumption of the power line communication system 1 can be reduced soon.

Note that the communication scheme A may be used for transmission of the control signal when the power line communication device 10 is provided with a capacitance element operable in an emergency, such as a spare battery, and also the control signal can be transmitted sooner using the communication scheme A than using the communication scheme B. In other words, the control signal may be transmitted in the state modulated under the communication scheme A by the modem A 109. In this case, the control signal can be transmitted to the other power line communication devices 20 in the shortest time, and thus the power consumption of the power line communication system 1 can be reduced to the lowest level soon.

Thereafter, the CPU 100 controls the clock controller 104 to stop the supply of the clock necessary for the modulation/demodulation operation under the communication scheme A, and instructs the communication controller 106 of the MAC 105 to stop the transfer of a signal to the modem A 109. When the communication scheme A is used for transmission of the control signal described above, these operations of stopping the clock supply and stopping the signal transfer to the modem A 109 are performed after the transmission of the control signal.

In each of the power line communication devices 20, in response to the control signal from the power line communication device 10 requesting to disable the communication scheme A, the CPU 200 stops the supply of the clock necessary for the modulation/demodulation operation under the communication scheme A, and instructs the MAC 205 to stop the transfer of a signal to the modem A 109. Also, under the control by the CPU 200, the MAC 205 generates a control signal requesting to disable the application (of the camera 520) requiring high-speed communication under the communication scheme A, and transmits the control signal to the information communication terminal 52.

Thereafter, the CPU 100 of the power line communication device 10 instructs the control signal generator 107 to generate a control signal requesting to disable the application (of the monitor 500) requiring high-speed communication under the communication scheme A and transmit the generated control signal to the information communication terminal 50.

When the information communication terminals 50 and 51 receive the control signal requesting to disable any application requiring high-speed communication under the communication scheme A from the corresponding power line communication devices 10 and 20, they output predetermined indications by using the monitor 500 and the LED 510 thereof, so that the user can be notified of decrease in the amount of generated electric power. When human manipulation is involved in the generating device 6, such as when the dynamo 60 is used in a bicycle, the user can be urged to increase the amount of generated electric power by being notified of decrease in the power amount. The means of notifying the user of decrease in the amount of generated electric power in the information communication terminals 50 and 51 are not limited to the monitor 500 and the LED 510, but may be an alarm, for example.

In this embodiment, when the amount of electric power supplied from the generating device 6 is less than the predetermined threshold, the communication scheme for high-speed communication is disabled to maintain the communication network with small power consumption.

When it is determined that the amount of electric power acquired by the power measurement portion 113 is not less than the predetermined threshold, all applications can be operated using the communication scheme for high-speed communication.

Since the comparator 103 determines the predetermined threshold based on the total number of power line communication devices 10 and 20 connected to the power line 7, the predetermined threshold can be determined appropriately even when there is addition or departure of a power line communication device, permitting appropriate control of the power consumption.

Since the multi-carrier scheme modem A 109 is provided for high-speed applications and the single-carrier scheme modem B 110 for low-speed applications, the two kinds of modulation/demodulation schemes different in power consumption can be effectively used simultaneously. The single-carrier scheme modem B 110 can be implemented at low cost using a simple, small-scale circuit, compared with the multi-carrier scheme modem A 109.

(Second Embodiment)

Figure 4:
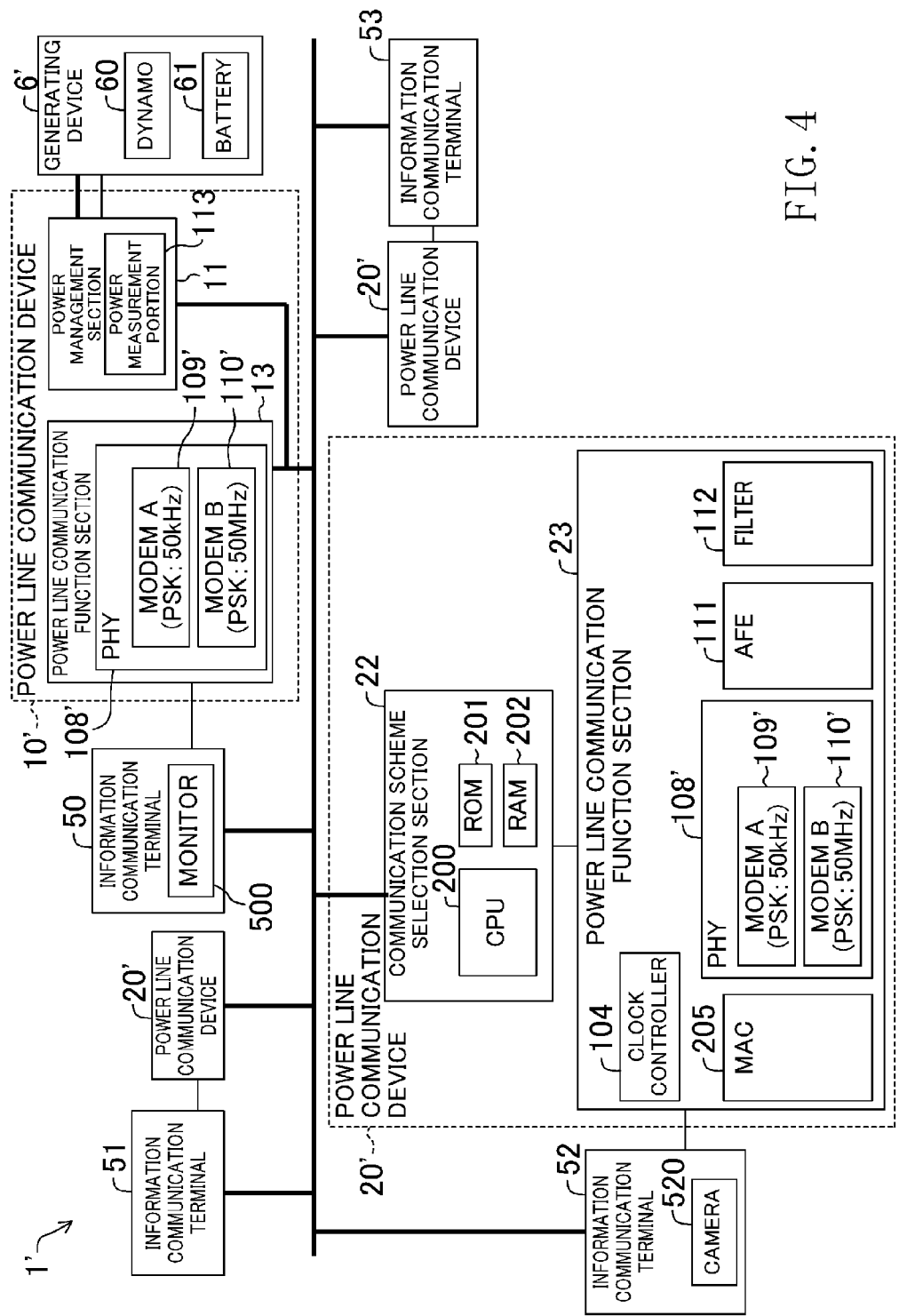
FIG. 4 is a block diagram of a power line communication system of the second embodiment.

As shown in FIG. 4, a power line communication system 1' of the second embodiment of the present disclosure includes a generating device 6' in place of the generating device 6, and power line communication devices 10' and 20' in place of the power line communication devices 10 and 20. The generating device 6' includes a battery 61 in addition to the configuration of the generating device 6. Each of the power line communication devices 10' and 20' includes a PHY 108' in place of the PHY 108. The PHY 108' includes a modem A 109' that performs modulation/demodulation under a single-carrier scheme such as phase-shift keying (PSK) modulation using a 50 kHz low-speed clock and a modem B 110' that performs modulation/demodulation under a single-carrier scheme such as PSK modulation using a 50 MHz high-speed clock, in place of the modem A 109 that performs modulation/demodulation under the communication scheme A and the modem B 110 that performs modulation/demodulation under the communication scheme B. The sampling frequency of the modulation/demodulation scheme of the modem A 109' is 50 kHz while that of the modem B 110' is 50 MHz. The power measurement portion 113 measures the amount of the current flowing from the generating device 6' to acquire the amount of electric power supplied to the entire power line communication system 1' by the generating device 6'.

In this embodiment, with the battery 61 provided in the generating device 6', the power line communication devices 10' and 20' are set to use both the modem A 109' using the 50 kHz low-speed clock and the modem B 110' using the 50 MHz high-speed clock in the initial state at turn-on. The capacity of the battery 61 decreases with the passage of time, and when it becomes zero, only the electric power generated by the dynamo 60 is supplied from the generating device 6'. If the amount of electric power generated by the dynamo 60 is less than the predetermined threshold, the CPU 100 selects the communication scheme smaller in power consumption, i.e., the communication scheme using the low-speed sampling clock (50 kHz), according to the determination result notified by the comparator 103. The other configuration and operation in this embodiment are the same as those in the first embodiment. Therefore, the same components are denoted by the same reference characters, and detailed description of such components is omitted here.

In this embodiment, with use of both the battery 61 and the dynamo 60 in the generating device 6', the function of a high-speed application can be implemented using the modem B 110 when the storage capacity of the battery 61 remains. When the storage capacity of the battery 61 becomes zero, the electric power generated by the dynamo 60 can be used to maintain the communication network and the power line communication system 1 until the battery 61 is replaced with new one.

Since the modem A 109' and the modem B 110' are different only in sampling frequency, they can be implemented without largely increasing the circuit scale by being provided with a mechanism of switching the frequency.

In the first embodiment, the modem A 109 performs modulation/demodulation under the multi-carrier scheme and the modem B 110 performs modulation/demodulation under the single-carrier scheme. Alternatively, both the modem A 109 and the modem B 110 may perform modulation/demodulation under the multi-carrier scheme, and the number of sub-carriers may be made different between the modulation/demodulation schemes of the modems. In this case, a common analog front end, a common filter, etc. may be used for both the modulation schemes.

In the second embodiment, the modem A 109' performs modulation/demodulation using a 50 kHz sampling frequency and the modem B 110' performs modulation/demodulation using a 50 MHz sampling frequency. The sampling frequencies of the modem A 109' and the modem B 110' are not limited to 50 kHz and 50 MHz, but may be any values different from each other within a range permitting modulation/demodulation.

In the first and second embodiments, the PHY 108 and 108' are configured to perform modulation/demodulation operation using two kinds of modulation/demodulation schemes. Alternatively, they may be configured to perform modulation/demodulation operation using three or more kinds of modulation/demodulation schemes. In this case, the CPU 100 may select only the modulation/demodulation scheme smallest in power consumption among the plurality of kinds of modulation/demodulation schemes when the amount of electric power acquired by the power measurement portion 113 is less than the predetermined threshold, or select all of the plurality of kinds of modulation/demodulation schemes when the amount of electric power is not less than the predetermined threshold. With this configuration, the power consumption observed when the amount of electric power acquired by the power measurement portion 113 is less than the predetermined threshold can be made smaller than that observed when the amount of electric power is not less than the predetermined threshold. The selection method by the CPU 100 is not limited to the above. For example, when it is determined that the amount of electric power is not less than the predetermined threshold, the CPU 100 may select only the modulation/demodulation scheme highest in speed and largest in power consumption. Also, the number of modulation/demodulation schemes selected when it is determined that the amount of electric power is less than the predetermined threshold is not limited to one, but may be two or more if only the power consumption can be made smaller than the case where it is determined that the amount of electric power is not less than the predetermined threshold.

In the first and second embodiments, the generating devices 6 and 6' generating electric power using the dynamo 60 are used. Alternatively, a generating device generating electric power using a rotary wing by wind-power generation, water-power generation, etc. may be used, and the power management section 11 may acquire the amount of electric power supplied to the entire power line communication system 1 based on the number of revolutions of the rotary wing of the generating device.

In the second embodiment, the generating device 6' including the combination of the battery 61 and the dynamo 60 is used. Alternatively, a power generator using human power, water power, wind power, or sunlight, other than the dynamo 60, may be combined with the battery 61. The modem B 110' may be operated when the storage capacity of the battery 61 remains, but may be stopped when the storage capacity becomes zero, to maintain the communication network and the communication system with the electric power obtained by the power generator.

The power line communication device and the power line communication system of the present disclosure, in which the power consumption decreases with decrease in the amount of electric power supplied to the entire power line communication system, provides an advantage of preventing failure in maintaining the communication network due to shortage of supply power. Thus, the present disclosure is useful as a power line communication system, such as a computerized bicycle system, where a plurality of power line communication devices are connected to each other via a power line and each of the power line communication devices can perform signal modulation/demodulation operation under a plurality of kinds of modulation/demodulation schemes, and a power line communication device constituting such a power line communication system.

What is claimed is:

1. A power line communication device, constituting a power line communication system including a plurality of power line communication devices connected to each other via a power line, each of the power line communication devices being capable of performing modulation operation for an internal signal to be transmitted to the power line and demodulation operation for an external signal received from the power line under a plurality of kinds of modulation/demodulation schemes, the device comprising:

a power management section configured to determine the amount of electric power supplied to the entire power line communication system by a generating device, said power management section determining said amount of electric power output by the generating device;

a comparison section configured to determine whether the amount of electric power determined by the power management section is less than a predetermined threshold;

a selection section configured to select, based on the determination result from the comparison section, at least one modulation/demodulation scheme among the plurality of kinds of modulation/demodulation schemes so that power consumption of modulation/demodulation operation is smaller when the amount of electric power is less than the predetermined threshold than when it is not less than the predetermined threshold; and a power line communication function section configured to transmit a control signal indicating the modulation/demodulation scheme selected by the selection section to the power line and perform modulation/demodulation operation under the selected modulation/demodulation scheme.

2. The power line communication device of claim 1, wherein the plurality of kinds of modulation/demodulation schemes include a multi-carrier scheme and a single-carrier scheme.

3. The power line communication device of claim 1, wherein the plurality of kinds of modulation/demodulation schemes include a plurality of single-carrier schemes different in sampling frequency.

4. The power line communication device of claim 1, wherein the plurality of kinds of modulation/demodulation schemes include a plurality of multi-carrier schemes different in the number of sub-carriers.

5. The power line communication device of claim 1, wherein the selection section selects only a modulation/demodulation scheme smallest in power consumption among the plurality of kinds of modulation/demodulation schemes when it is determined by the comparison section that the amount of electric power is less than the predetermined threshold.

6. The power line communication device of claim 1, wherein the selection section selects only a highest-speed modulation/demodulation scheme among the plurality of kinds of modulation/demodulation schemes, or all the modulation/demodulation schemes, when it is determined by the comparison section that the amount of electric power is not less than the predetermined threshold.

7. The power line communication device of claim 1, wherein the control signal is a signal modulated under a modulation/demodulation scheme smallest in power consumption among the plurality of kinds of modulation/demodulation schemes.

8. The power line communication device of claim 1, wherein the control signal is a signal modulated under a modulation/demodulation scheme shortest in communication delay among the plurality of kinds of modulation/demodulation schemes.

9. The power line communication device of claim 1, wherein
an information communication terminal is connected to each of the power line communication devices, and
the comparison section determines the predetermined threshold based on the total number of power line communication devices connected to the power line, the maximum power consumption of each of the power line communication devices, and the maximum power consumption of each of the information communication terminals.

10. The power line communication device of claim 1, wherein
electric power is supplied to the entire power line communication system by the generating device using a rotary wing, and
the power management section determines the amount of electric power supplied to the entire power line communication system based on the number of revolutions of the rotary wing of the generating device.

11. The power line communication device of claim 1, wherein
electric power is supplied to the entire power line communication system by the generating device using a dynamo generating a current having a pulse waveform, and
the power management section determines the amount of electric power supplied to the entire power line communication system based on the interval between rising edges of continuous pulses of the current generated by the dynamo of the generating device.

12. The power line communication device of claim 1, wherein
an information communication terminal is connected to each of the power line communication devices, and
when it is determined by the comparison section that the amount of electric power is less than the predetermined threshold, a predetermined indication is output by the information communication terminal corresponding to each of the power line communication devices.

13. A power line communication system having a plurality of power line communication devices connected to each other via a power line, each of the power line communication devices being capable of performing modulation operation for an internal signal to be transmitted to the power line and demodulation operation for an external signal received from the power line under a plurality of kinds of modulation/demodulation schemes, wherein
one of the plurality of power line communication devices is a main power line communication device including:
a power management section configured to determine the amount of electric power supplied to the entire power line communication system by a generating device, said power management section determining said amount of electric power output by the generating device,
a comparison section configured to determine whether the amount of electric power determined by the power management section is less than a predetermined threshold,
a selection section configured to select, based on the determination result from the comparison section, at least one modulation/demodulation scheme among the plurality of kinds of modulation/demodulation schemes so that power consumption of modulation/demodulation operation is smaller when the amount of electric power is less than the predetermined threshold than when it is not less than the predetermined threshold, and
a power line communication function section configured to transmit a control signal indicating the modulation/demodulation scheme selected by the selection section to the power line and perform modulation/demodulation operation under the selected modulation/demodulation scheme.

* * * * *